United States Patent
Ackermann

(10) Patent No.: US 7,441,625 B2
(45) Date of Patent: Oct. 28, 2008

(54) SELF-PROPELLED VEHICLE, IN PARTICULAR A ROAD-BUILDING MACHINE AND A METHOD FOR DRIVING AND CONTROLLING A VEHICLE WITH THE AID OF A ROTATABLE DRIVER SEAT

(75) Inventor: Hans-Peter Ackermann, Tirschenreuth (DE)

(73) Assignee: Hamm AG, Tirschenreuth (DE)

( * ) Notice: Subject to any disclaimer, the term of this patent is extended or adjusted under 35 U.S.C. 154(b) by 296 days.

(21) Appl. No.: 10/539,299

(22) PCT Filed: Aug. 7, 2003

(86) PCT No.: PCT/EP03/08735

§ 371 (c)(1), (2), (4) Date: Jun. 16, 2005

(87) PCT Pub. No.: WO2004/059088

PCT Pub. Date: Jul. 15, 2004

(65) Prior Publication Data

US 2006/0113141 A1    Jun. 1, 2006

(30) Foreign Application Priority Data

Dec. 20, 2002   (DE) ............................... 102 60 902

(51) Int. Cl.
    *B60K 26/00*    (2006.01)

(52) U.S. Cl. ....................................................... 180/326
(58) Field of Classification Search ................. 180/326, 180/329; 296/190.01, 190.04, 190.05, 65.06, 296/65.07
    See application file for complete search history.

(56) References Cited

FOREIGN PATENT DOCUMENTS

WO    WO 9320791 A1  *  10/1993

* cited by examiner

*Primary Examiner*—Christopher Ellis
*Assistant Examiner*—Robert A. Coker
(74) *Attorney, Agent, or Firm*—Diller, Ramik & Wight

(57) ABSTRACT

The inventive self-propelled vehicle, in particular a road-building machine, comprises a traction drive, a steering device and a rotatable driver seat (5) in which a traction drive control unit (6) is arranged. Adjustment signals for the traction drive are generated according to the direction of the adjustment of the control elements of said control unit (6). Said road-building machine also comprises a device for detecting the rotation angle μ of the instant rotating position of the seat and for correcting the directional components of the adjustment signals of the control elements to a −μ angle in such a way that the direction of the adjustment thereof corresponds to the direction of the vehicle motion at each rotating position of the seat.

14 Claims, 3 Drawing Sheets

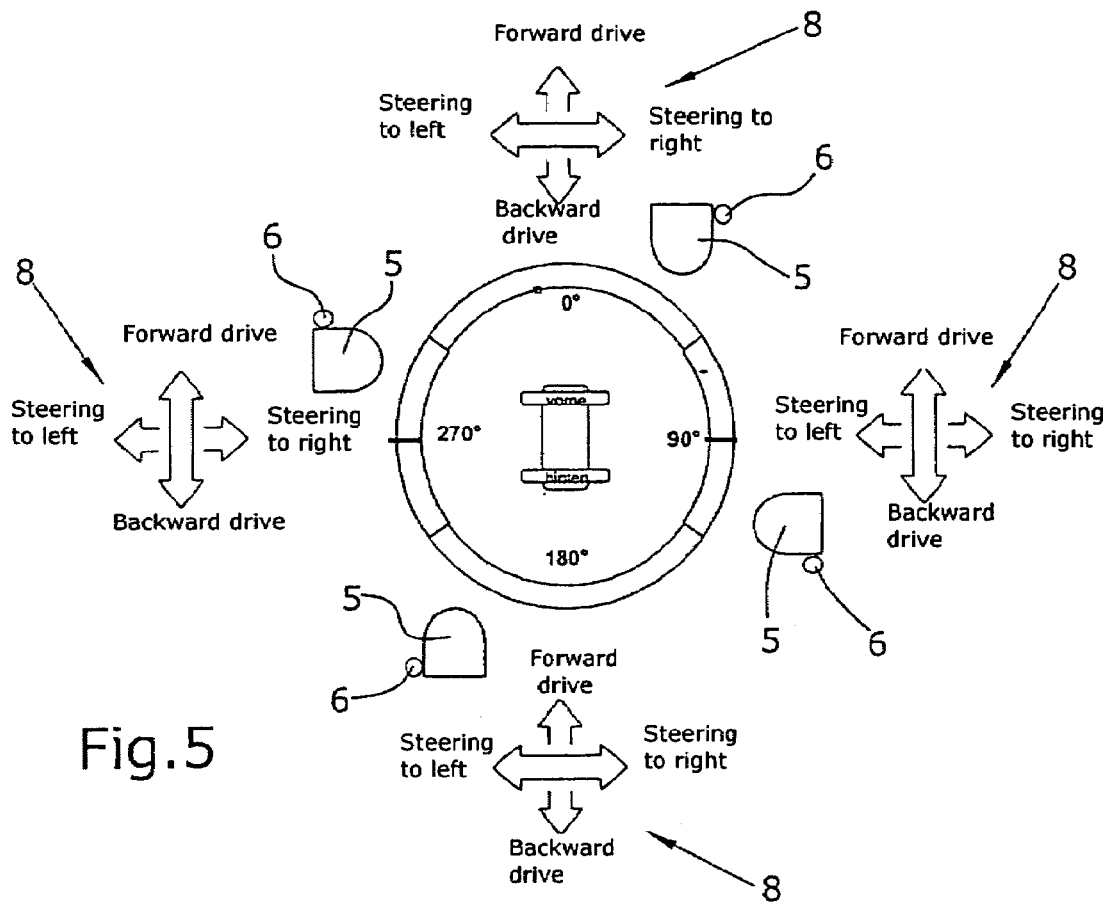
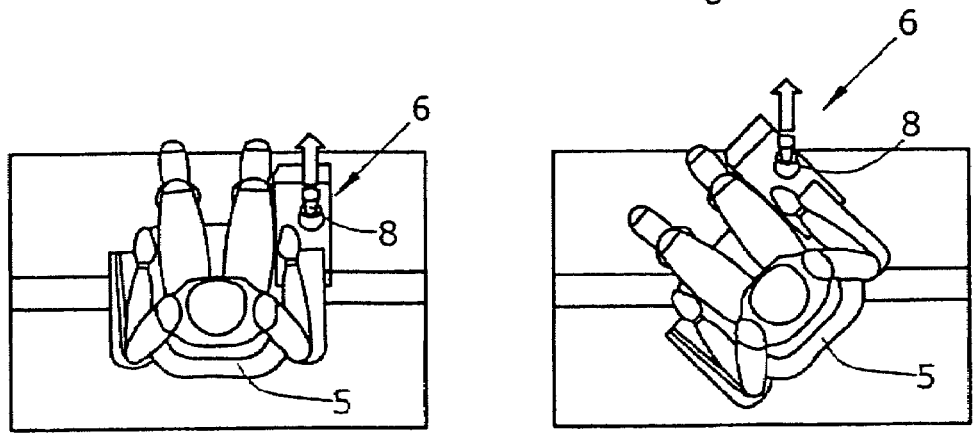
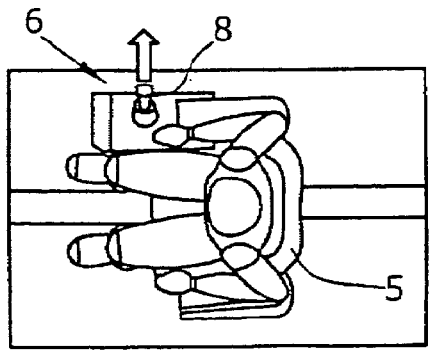
Fig. 5
Fig. 6

SELF-PROPELLED VEHICLE, IN PARTICULAR A ROAD-BUILDING MACHINE AND A METHOD FOR DRIVING AND CONTROLLING A VEHICLE WITH THE AID OF A ROTATABLE DRIVER SEAT

BACKGROUND OF THE INVENTION

Self-propelled vehicle, in particular a road-building machine and a method for driving and controlling a vehicle with the aid of a rotatable driver seat The invention refers to a self-propelled vehicle.

Such vehicles that have a rotatable driver's seat are known, for example, from road-building machines and in particular from road rollers.

It is a requirement with road rollers to develop a driver's seat that is freely rotatable around its vertical axis, since the operational conditions of a roller require a continuous change of the seat position of the operator relative to the travelling direction of the road roller. A prerequisite for a feasibility in terms of costs and functionality is that the control elements rotate with the driver's seat. Otherwise, a plurality of redundant control elements would have to be used, which would be expensive. Typically, an asphalt roller, for example, works behind a paver that places the material and performs a pre-compaction. The roller travels several times over the surfaces laid by the paver to provide the final compacting and the planarity of the surface. In doing so, the direction of travel is changed frequently—the number of forward and backward travels is almost equal. To provide for or improve upon the visibility of the working area, the security and the ergonomics of the operation of the machine, it is necessary to rotate the driver's seat by 180° every time the direction of travel is changed. Here, the roller may cab still on the hot asphalt only for the short duration taken by the change of the travelling direction. Therefore and for reasons of time, the driver's seat should be rotated while driving. For respective short distances with different travelling directions, a seat position rotated by 90° relative to the travelling direction is feasible. Depending on the course to be travelled, seat positions between 0 and 90° relative to the travelling direction may also be ergonomically feasible.

For a safe operation of the machines, the essential control elements, such as travelling direction transmitters (steering wheel, joystick) and drive lever, for selecting the travelling direction and the speed must be associated with the travelling direction in a manner unambiguous to the operator. Existing systems do not solve this problem. Accordingly, a free rotation of the driver's seat including the control elements while the roller travels—which is feasible in terms of application technology—was hereinbefore impossible.

EP 0935025 describes a system with a rotatable driver's seat, wherein the traction drive is controlled dependent on the rotational position of the driver's seat such that a control device reverses the direction of the drive presettings when the driver's seat is swivelled into a preset region. However, this reversal can only be effected with the roller at cabstill. Would the roller be travelling, rotating the driver's seat could for instance cause a reversal of the travelling direction of the roller that might not be intended by the driver.

From EP 0935023 A2, a method for a roller with two steerable drums that comprises a control device controlling the steering drive of both drums such that the respective front drum, seen in the travelling direction, is automatically controlled as the active drum through the steering presettings. Again, this method does not solve the problem of the sense of direction of the control elements when the seat position changes during travel.

SUMMARY OF THE INVENTION

It is an object of the present invention to improve a self-propelled vehicle with a rotatable driver's seat of the above mentioned type, as well as a method for driving and steering a vehicle with a rotatable driver's seat such that the association of the travelling direction of the control elements with the travelling direction of the vehicle is maintained in any rotation angle position of the driver's seat.

The invention advantageously provides that, in a control unit for the driving operation which generates actuation signals for the traction drive and the steering means in dependence on the direction of actuation of the control elements of the control unit, a means detects the instantaneous rotation angle $\mu$ of the rotational position of the seat and corrects the direction of the actuation signals of the control elements by an angle $-\mu$ such that the direction of actuation of the control elements corresponds to the travelling direction of the vehicle in any rotational position of the seat.

The invention advantageously allows that the control elements of the control unit always maintains a direction of actuation that corresponds to the travelling direction of the machine, even if the driver's seat is rotated during traction drive. Thus, the driver's seat is freely rotatable during travel without having to interrupt the driving operation.

The means for detecting the instantaneous rotation angle of the rotational seat position transmits the rotation angle mechanically, electro-mechanically, optically or electrically to the control unit.

Transmitting the rotation angle to the elements allows to correct the actuation signals generated by the control elements of the control unit by a value corresponding to the rotation angle of the driver's seat so that a change of the rotational position of the seat has no influence on the direction of actuation.

The direction of actuation of the control elements is thus always the same and corresponds to the travelling direction of the vehicle.

In the control unit, the actuation signals for the selection of the travelling direction and the steering are continuously corrected in dependence on the rotation angle of the instantaneous rotational position of the seat. The continuous correction of the direction of the actuation signals allows for a free optional rotation of the driver's seat during travel.

The control unit comprises a single control lever for the selection of the travelling direction, the travelling speed and the steering.

The control lever is supported by a universal joint provided on a turnover that may be rotated by an angle $-\mu$ when the driver's seat takes a seat position under an angle of $\mu$.

The transmission of the rotation angle to the control unit may be effected, for example, using a flexible transmission shaft, an electromotor drive or a torsion bar.

The housing of the control unit is preferably connected with the driver's seat in a stationary manner.

The vehicle may have two steerable axes, the steering control being adapted to switch the control lever to one of the two axes or to both axes.

Preferably, the control lever is guided in two mutually orthogonal slotted links.

The vehicle is a road-building machine, preferably a road roller.

The following is a detailed description of an embodiment of the invention with reference to the drawings.

BRIEF DESCRIPTION OF THE DRAWINGS

FIGS. 5 and 6 illustrate different rotational positions of the driver's seat.

DETAILED DESCRIPTION OF THE PREFERRED EMBODIMENTS

Figure 1:
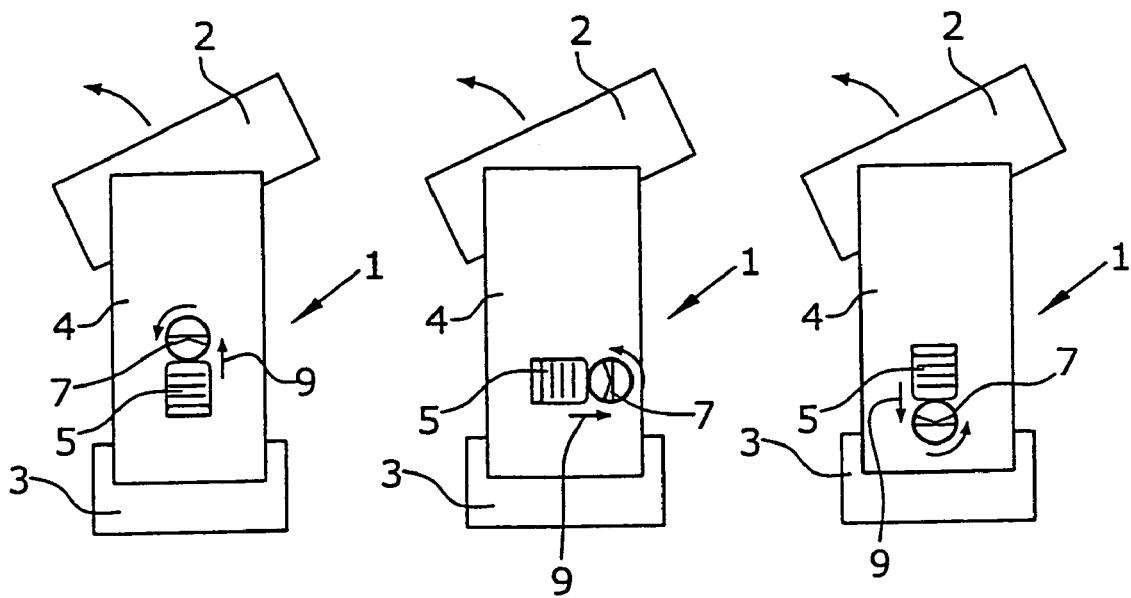
FIG. 1 illustrates a road roller with a rotatable driver's seat according to prior art.
Figure 2:
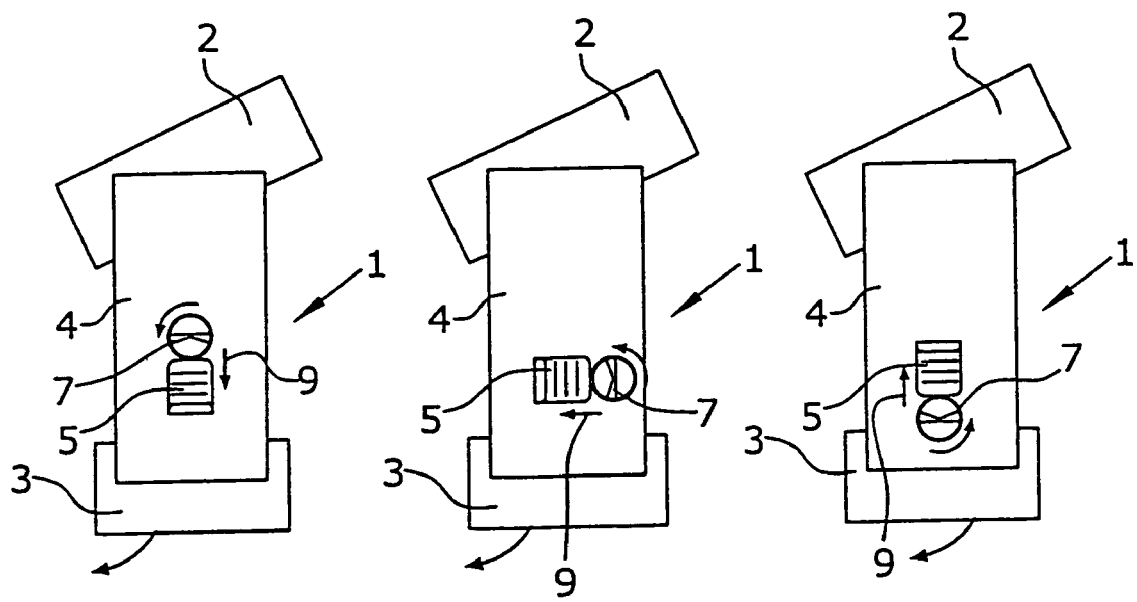
FIG. 2 is a view similar to FIG. 1 with the travelling direction being reversed.
Figure 3:
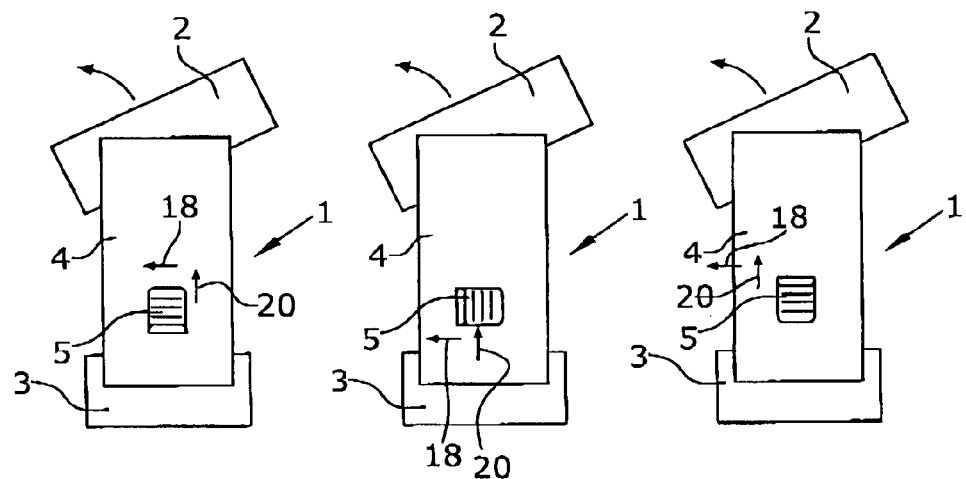
FIG. 3 illustrates the actuation direction of the control lever according to the invention.

FIGS. 1 to 3 schematically illustrate a road roller 1 with two roller drums 2, 3, at least one of which is steerable. The roller drums are interconnected through a chassis 4 on which a driver's cab for an operator is arranged.

The driver's cab is provided with a rotatable driver's seat 5 with an integrated control unit for the drive operation. The control unit 6 preferably comprises a control lever 8 whose functions will be detailed in connection with FIG. 4.

FIG. 1 illustrates a road roller 1 with at least one steerable drum 2. The drum steered is the front drum 2, seen in the travelling direction. In the left portion of the Figure, the position of the seat is aligned with the travelling direction. In this case, turning the steering wheel 7 to the left causes a change of the travelling direction towards the left, the drive lever 9 is deflected in the travelling direction of the road roller 1. When the driver's seat, including the control unit 6, is swivelled by 90° to the left or the right (middle portion of the Figure), it is already impossible to unambiguously associate the direction of actuation at the control elements of the control unit to the travelling direction. When the seat position is rotated by 180° while the travelling direction remains the same (right portion of the Figure), the direction of the actuation of the control elements does not correspond to the travelling direction. Consequently, the machine cannot be operated safely.

FIG. 2 illustrates the same situation, but with the travelling direction changed. Again, swivelling the driver's seat results in a loss of association between the travelling direction of the road roller and the respective direction of actuation of the control elements drive lever 9 and steering wheel 7.

FIG. 3 describes the solution underlying the invention, which integrates the drive lever 9 and, preferably, the steering function in one control lever. In the case illustrated, the control lever 8 is deflected in the direction of the arrow (20) and remains in this position—the machine travels in the direction of the arrow. Moving the control lever 8 in the direction of the arrow (18) causes a steering motion of the drum—the machine travels to the left. When the driver's seat is rotated by 90° during travel, the control lever 8 is tracked such that its sense of deflection still corresponds to the travelling direction. The direction of movement of the control lever 8 for steering corresponds to the direction of movement of the road roller 1. The same is true for the rotation of the driver's seat 5 by 180°. The driver's seat 5 may further be rotated freely by more than 180°.

Figure 4:
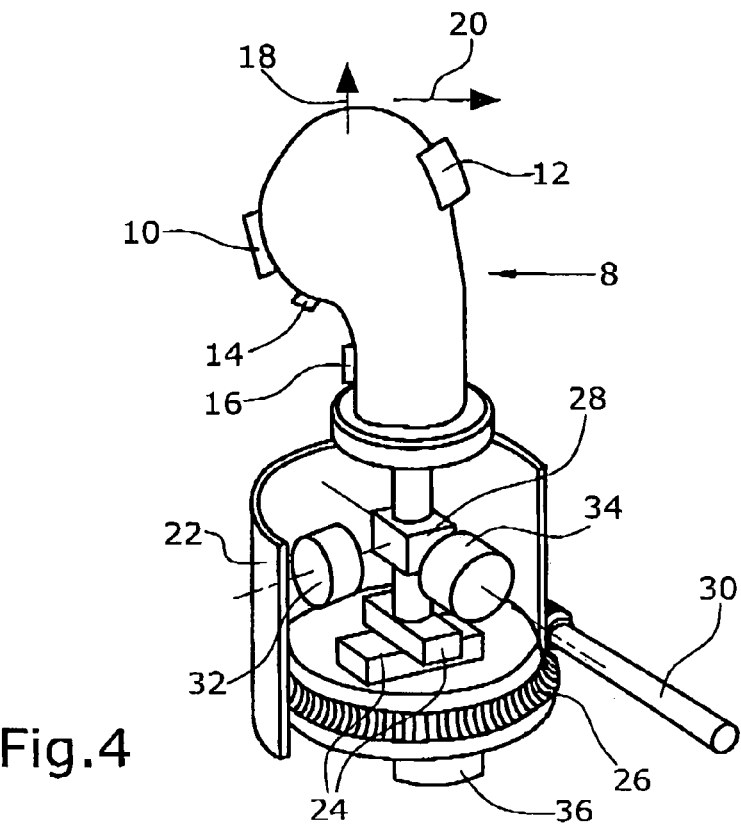
FIG. 4 schematically shows the present control lever of the control unit.

FIG. 4 illustrates the control unit 6 with its components, the control functions and the device for transmitting the rotary motion of the driver's seat 5 to the control unit. The control lever 8 comprises switching means 10 for the functions of lifting and lowering the edge pressing device, a switch means 12 for the rear wheel steering or dog's movement, a switch means 14 for turning vibration on and off, a switch means 16 for unlocking the immobilizer, as well as a switch means 18 with two degrees of freedom for the setting of the steering direction and a switch means 20 for the travelling direction. To make it easier on the operator to differentiate between a steering motion and a travelling motion during the deflection of the control lever 8, the steering motion is actuated against a spring force towards the neutral position and the travelling deflection is actuated against a friction force. Preferably, the essential mentioned control functions are integrated in one control unit 6. The housing 22 is fixedly connected to the driver's seat 5.The control lever 8 is guided in two mutually orthogonal slotted links 24. Deflecting the control lever 8 in the direction of travel or steering causes a deflection of the respective slotted link 24 for the travelling or steering motion, respectively. The slotted link 24 for the travelling motion slides on the turnover 26 that also limits the outer position thereof. Shifted by 90°, the steering motion slides on the slotted link 24 for the travelling motion. In the upper portion, the control lever 8 is guided by a universal joint 28. In the embodiment illustrated, the rotary motion of the driver's seat 5 about its vertical axis is transmitted to the turnover 26 through a flexible shaft 30 acting as a. transmission shaft. The rotary motion may also be transmitted by an electromotor or through a torsion bar. Swivelling the driver's seat 5 by an angle μ causes a turning of the turnover 26 in the housing 22 about an angle −μ (same value of the rotation angle, but different sign). Together with the turnover 26, the slotted links 24 for the travelling and the steering motion turn. Thus, the association of the direction of actuation of the control lever 8 with the travelling direction of the road roller 1 is guaranteed.

The deflection of the control lever 8 for steering and travelling is detected by two potentiometers 32 (direction x) and 34 (direction y) in the universal joint 28 (pivot point of the control lever 8). A third potentiometer 36 is mounted below the turnover 26 on the axis of rotation thereof, measuring the rotation angle of the turnover 26 relative to the housing 22 and thus the seat position. The potentiometers 32 and 34 are connected to the housing 22 in a manner secured against rotation, i.e. swivelling the driver's seat 5 changes the association of the respective potentiometer 32 and 34 to the deflection of the drive lever. For example, in the initial position of the seat, the steering deflection of the control lever 8 is detected for 100% by the potentiometer 34. Swivelling the driver's seat 5 causes a change of the position of the control lever 8 relative to the potentiometers—i.e., the twisting of the universal joint 28 in its two axes changes. Corresponding to the rotation angle of the seat measured by the rotation angle potentiometer, the steering deflection of the control lever 8 is then sensed in part by both potentiometers 32, 24 in the directions x and y. Since the rotation angle μ is known, the resulting signal can be calculated. The signal portion of the potentiometers 32, 34 in the directions x and y, which changes with the swivelling of the seat, and the association of the control lever 8 to the seat position is illustrated in FIGS. 5 and 6.

FIG. 5 schematically illustrates four different seat positions of the seat 5, shifted by 90° each, with the corresponding control unit 6. For each respective seat position, direction arrows illustrate in which direction the control lever 8 has to be moved for the functions indicated. It is evident from the illustration that the direction of actuation of the control lever 8 remains the same in all seat positions.

FIG. 6 also illustrates the direction of actuation of the control lever 8, the arrow representing the direction for forward travel in all seat positions.

Although a preferred embodiment of the invention has been specifically illustrated and described herein, it is to be understood that minor variations may be made in the apparatus without departing from the spirit and scope of the invention, as defined by the appended claims.

What is claimed is:

1. A self-propelled road-building machine, comprising:
a driver's cab arranged on a chassis (4),
a drive for moving the self-propelled machine,
a steering means,
a rotatable driver's seat (5) having a rotational position defined by an actual rotation angle μ and being provided in the driver's cab with an integrated control unit (6) for a driving operation, which generates actuation signals for the drive and the steering means in dependence on a direction of actuation of control elements of the control unit (6),
characterized in that
means for detecting the actual rotation angle μ of a rotational position of the seat and correct the direction components of the actuation signals of the control elements by an angle −μ
such that the direction of actuation of the control elements coincides to the direction of movement of the vehicle in any rotational position of the seat.

2. The self-propelled vehicle as defined in claim 1 wherein the means for detecting the actual rotation angle μ of the rotational position of the seat transmits the rotation angle μ mechanically, electromechanically, optically or electrically to the control elements of the control unit (6).

3. The self-propelled vehicle as defined in claim 2 wherein, in the control unit (6), the actuation signals for the traveling direction and the steering may be continuously corrected in dependence on the rotation angle μ of the actual rotational position of the seat.

4. The self-propelled vehicle as defined in claim 2, wherein the control unit (6) comprises a single control lever (8) as the control element for the selection of the traveling direction, the traveling speed and the steering.

5. The self-propelled vehicle as defined in claim 1 wherein, in the control unit (6), the actuation signals for the traveling direction and the steering may be continuously corrected in dependence on the rotation angle μ of the actual rotational position of the seat.

6. The self-propelled vehicle as defined in claim 5, wherein the control unit (6) comprises a single control lever (8) as the control element for the selection of the traveling direction, the traveling speed and the steering.

7. The self-propelled vehicle as defined in claim 1, wherein the control unit (6) comprises a single control lever (8) as the control element for the selection of the traveling direction, the traveling speed and the steering.

8. The self-propelled vehicle as defined in claim 7 wherein the control lever (8) is supported in a universal joint (28) and the universal joint (28) rests on a turnover (26) rotatable about a rotation angle −μ when the rotational position of the driver's seat (5) assumes a rotation angle μ.

9. The self-propelled vehicle as defined in claim 8 wherein the control lever (8) is guided in two mutually orthogonal slotted links (24).

10. The self-propelled vehicle as defined in claim 7 wherein the control lever (8) is guided in two mutually orthogonal slotted links (24).

11. The self-propelled vehicle as defined in claim 1 wherein the vehicle has two steerable axes and wherein, at the control unit (6), the steering control may be switched to one of both axes or to both axes.

12. The self-propelled vehicle as defined in claim 11 wherein the control lever (8) is guided in two mutually orthogonal slotted links (24).

13. The self-propelled vehicle as defined in claim 1 wherein the vehicle is a road roller (1).

14. A method for driving and steering a road-building machine, with a rotatable driver's seat (5) provided in a driver's cab and a control unit (6) for a driving operation which is integrated in the driver's seat (5) and includes control elements, by performing the steps of
detecting an actual rotation angle μ of a rotational position of the seat and a continuous correction of the actuation signals of the control elements by an angle −μ, and
coinciding the direction of actuation of the control elements to the direction of movement of the vehicle in any rotational position of the seat.

* * * * *